UNITED STATES PATENT OFFICE.

JOHN CARNRICK, OF NEW YORK, N. Y.

MEDICAL COMPOUND.

SPECIFICATION forming part of Letters Patent No. 412,838, dated October 15, 1889.

Application filed June 22, 1889. Serial No. 315,266. (No specimens.)

*To all whom it may concern:*

Be it known that I, JOHN CARNRICK, a citizen of the United States, residing at the city of New York, in the county of New York and State of New York, have invented an Improved Sedative Nerve and Brain Food Compound, of which the following is a specification.

This invention relates to a granular effervescing compound, suitable for admixture with water to form an agreeable, refreshing drink, and constituting a sedative, nerve, and brain food.

The object of the invention is to provide in convenient agreeable form a prompt and efficient remedy for headache, neuralgia, insomnia, neurasthenia, and general nervous irritability; also, to provide for the weary brain-worker not only a nerve sedative but a brain and nerve food; also, to provide a compound in dry granular form which can be readily added to a glass of water to produce a most refreshing beverage, quite as agreeable to the taste as soda-water, while it is much more remedial and tonic in effect, especially adapted for persons afflicted with the nerve and brain maladies above mentioned.

In carrying out my invention I mix with one or more of the nerve sedatives—such as extract apii graveolens dulcis (solid extract of celery) and bromide of sodium or potassium—one or more of the antipyretics—such as antipyrene, antifebrine, kairin, sulphate of thalline or benzanilide, giving preference, however, to antipyrene and antifebrine—and to such mixture I add a nerve food, preferably phosphoric acid, and a tonic stimulant, as caffeine. These ingredients are mixed with a proper proportion of an alkaline carbonate and one or more fruit acids, to form an effervescing compound.

I preferably mix the ingredients forming my compound in about the following proportions, so that each dose will contain caffeine, acid phosphoricum, āā grains ss, antipyrene, extract apium graveolens dulcis, (celery,) āā grains, j, sodium bromide grains v. To these ingredients I add suitable proportions of tartaric acid, citric acid, bicarbonate of soda, and sugar, to form a pleasant effervescing compound. All of these ingredients are reduced to a powder and thoroughly mixed in a revolving or other mixer. They are then placed in a porcelain-lined steam-jacketed vessel and heated till well melted or fused. The resulting magma, in a sufficiently moist state, is passed through a sieve of about eight to twelve meshes to the inch, so as to reduce it to a granular condition. The granular compound is then carefully dried in the drying-room, resulting in a body of perfectly dry irregular light granules. In this condition the compound is put up in bottles, which are immediately corked and preferably sealed airtight for its perfect preservation.

While I prefer to use all the active ingredients stated in the above formula in manufacturing my sedative, nerve, and brain food, commonly known as "phospho-caffeine," as giving the most satisfactory results, I consider that the most essential and important constituents are caffeine, phosphoric acid, and antipyrene or antifebrine. A mixture of these three ingredients forms part of my invention.

While the tonic and stimulating action of the caffeine is quickly exerted, the phosphoric acid serves to feed the nerve and brain tissue and prevent reaction and depression. The antipyrene or antifebrine allays a feverish condition and stops headache. The extract of celery, besides exercising its sedative effect, gives a pleasant flavor to the compound. The bromide of sodium or bromide of potassium exercises its well-known quieting influence upon the brain and nerves. The sedative action of the drugs used for that purpose produces no unpleasant after effects, for the reason that the nerve and brain food (the phosphoric acid) restores the nerves and brain to their normal condition. When taken at night no unpleasant feelings, as a result thereof, are experienced in the morning.

My improved compound has been found by thorough testing to give most satisfactory results, and may be given in doses of one to two heaping tea-spoonfuls in half a tumbler of water.

Having described my invention, I claim, and desire to secure by Letters Patent, as follows:

1. A medical compound containing caffeine, phosphoric acid, and an antipyretic, as antipyrene or antifebrine.

2. A granular effervescing compound containing, as active ingredients, caffeine, phosphoric acid, and an antipyretic, such as antipyrene or antifebrine.

3. A medical compound in the nature of a sedative, nerve, and brain food, containing caffeine, phosphoric acid, an antipyretic, as antipyrene or antifebrine, and one or more sedatives, as extract of celery and sodium or potassium bromide.

4. A granular effervescing medical compound in the nature of a sedative, nerve, and brain food, containing caffeine, phosphoric acid, an antipyretic, as antipyrene or antifebrine, extract of celery, and sodium or potassium bromide.

JOHN CARNRICK.

Witnesses:
WM. F. McPHERSON,
ALLEN CHAMBERLIN.